Feb. 8, 1966   R. G. LAHR   3,233,364
ELECTRIC DISTRIBUTION MEANS FOR ELECTRIC DRIVEN VEHICLES
Filed Feb. 12, 1962   6 Sheets-Sheet 1
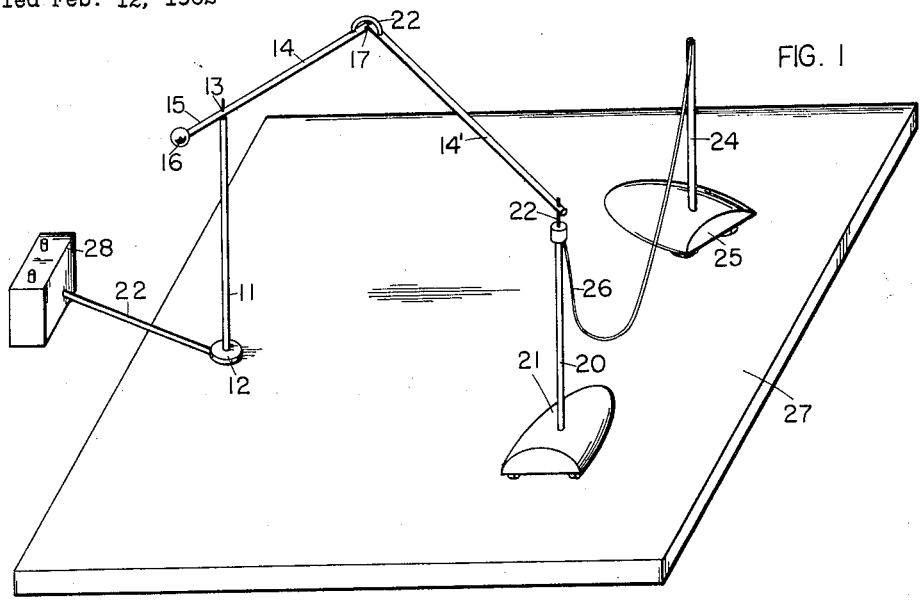
FIG. 1
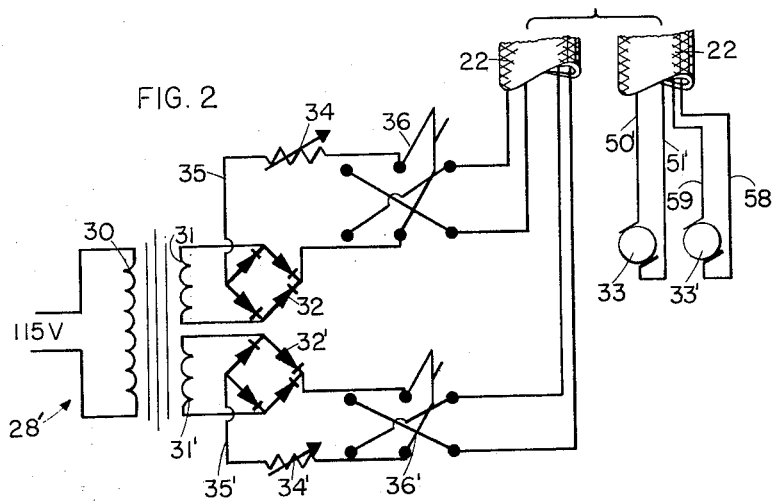
FIG. 2
INVENTOR.
ROBERT G. LAHR
BY 
ATTORNEY Feb. 8, 1966 R. G. LAHR 3,233,364
ELECTRIC DISTRIBUTION MEANS FOR ELECTRIC DRIVEN VEHICLES
Filed Feb. 12, 1962 6 Sheets-Sheet 2
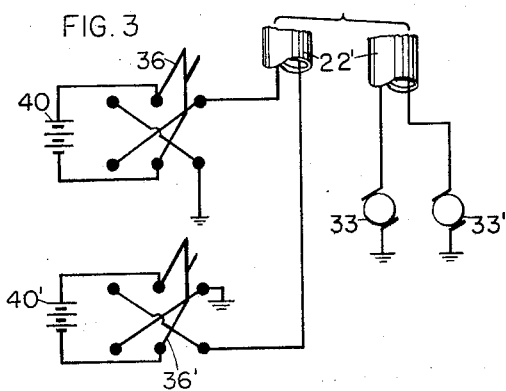
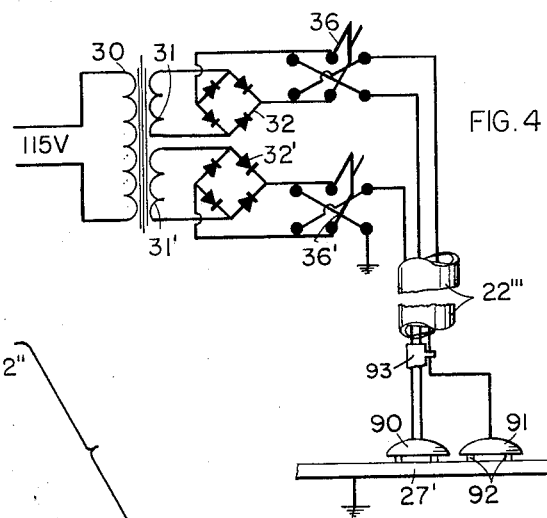
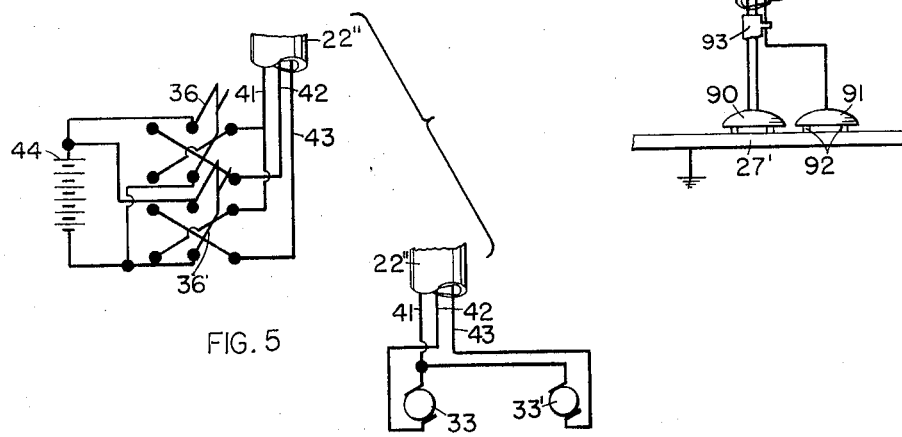
INVENTOR.
ROBERT G LAHR
BY
ATTORNEY Feb. 8, 1966   R. G. LAHR   3,233,364
ELECTRIC DISTRIBUTION MEANS FOR ELECTRIC DRIVEN VEHICLES
Filed Feb. 12, 1962   6 Sheets-Sheet 3
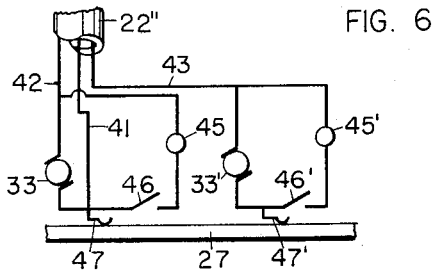
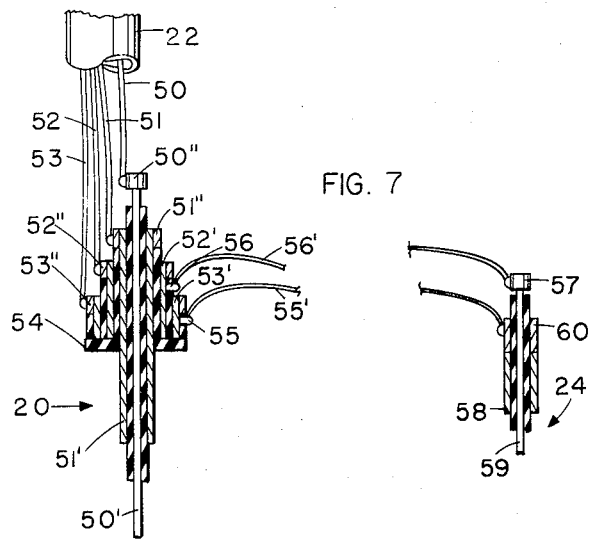
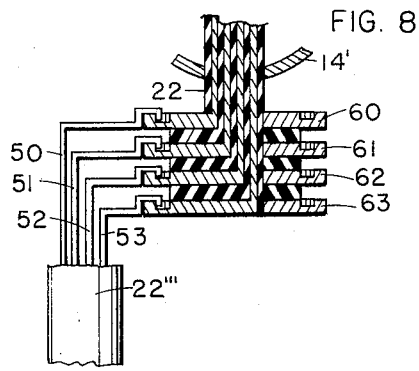
INVENTOR.
ROBERT G. LAHR
BY
ATTORNEY Feb. 8, 1966 R. G. LAHR 3,233,364
ELECTRIC DISTRIBUTION MEANS FOR ELECTRIC DRIVEN VEHICLES
Filed Feb. 12, 1962 6 Sheets-Sheet 4
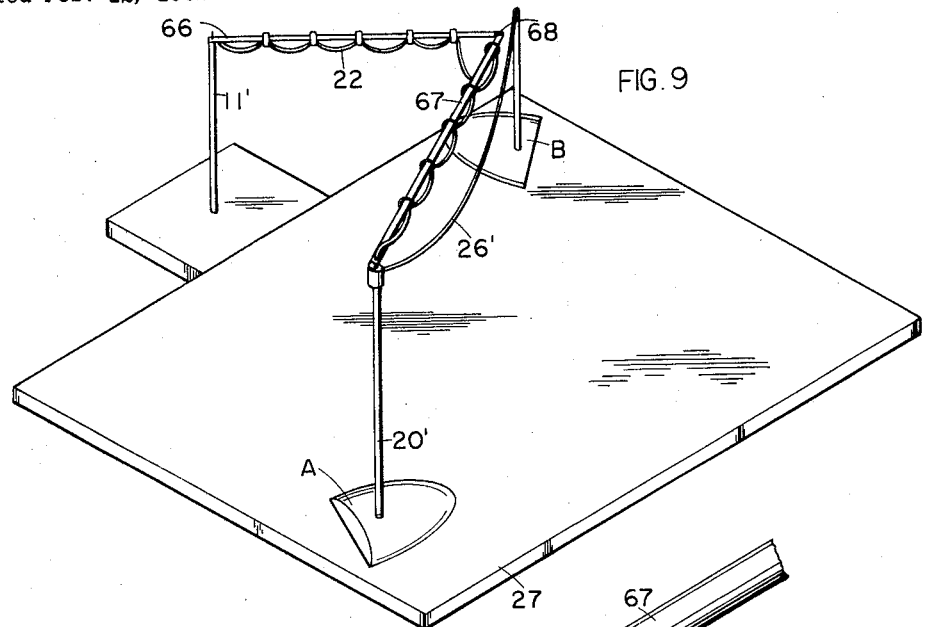
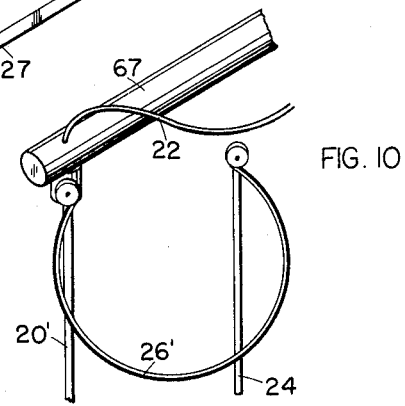
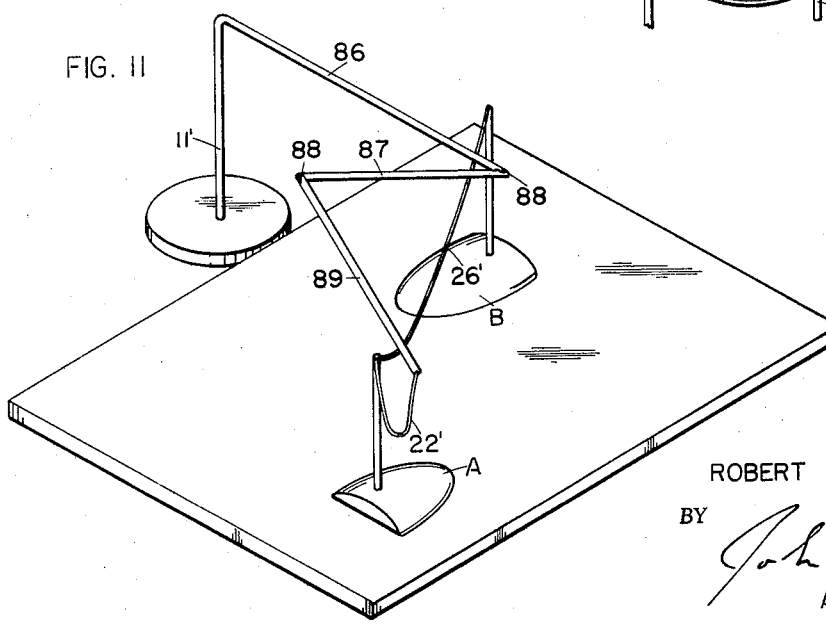
INVENTOR.
ROBERT G. LAHR
BY
ATTORNEY Feb. 8, 1966 R. G. LAHR 3,233,364
ELECTRIC DISTRIBUTION MEANS FOR ELECTRIC DRIVEN VEHICLES
Filed Feb. 12, 1962 6 Sheets-Sheet 5
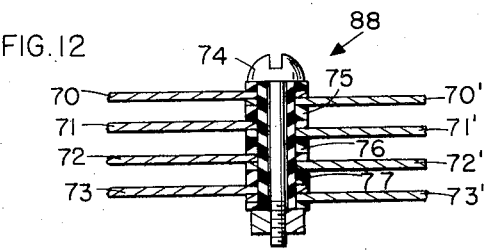
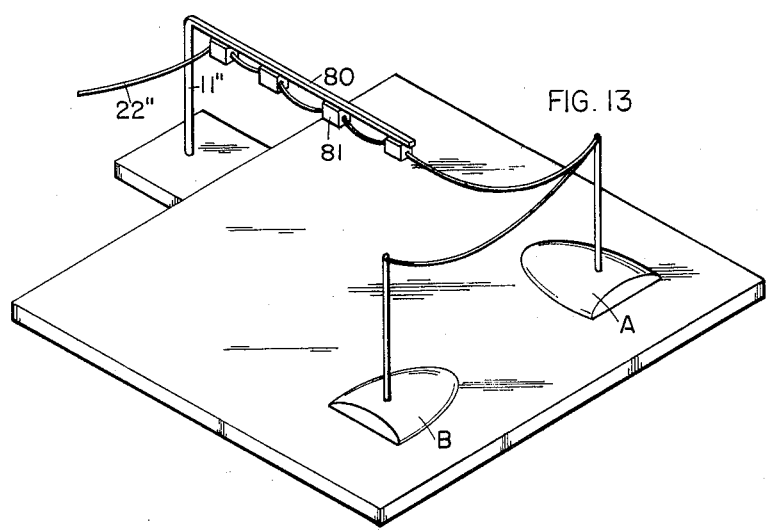
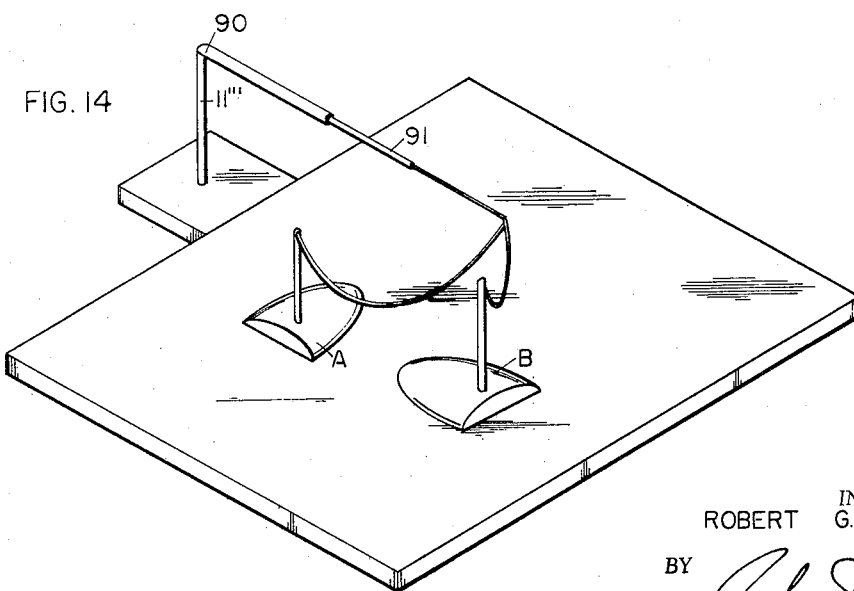
INVENTOR.
ROBERT G. LAHR
BY
ATTORNEY Feb. 8, 1966 R. G. LAHR 3,233,364
ELECTRIC DISTRIBUTION MEANS FOR ELECTRIC DRIVEN VEHICLES
Filed Feb. 12, 1962 6 Sheets-Sheet 6
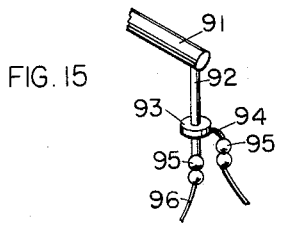
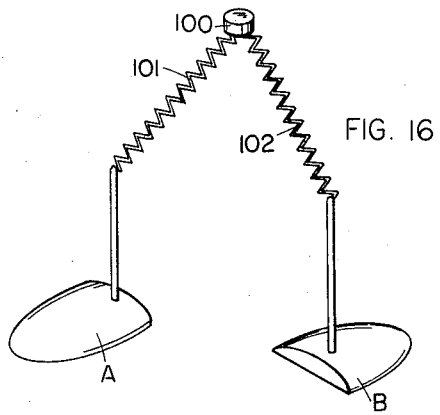
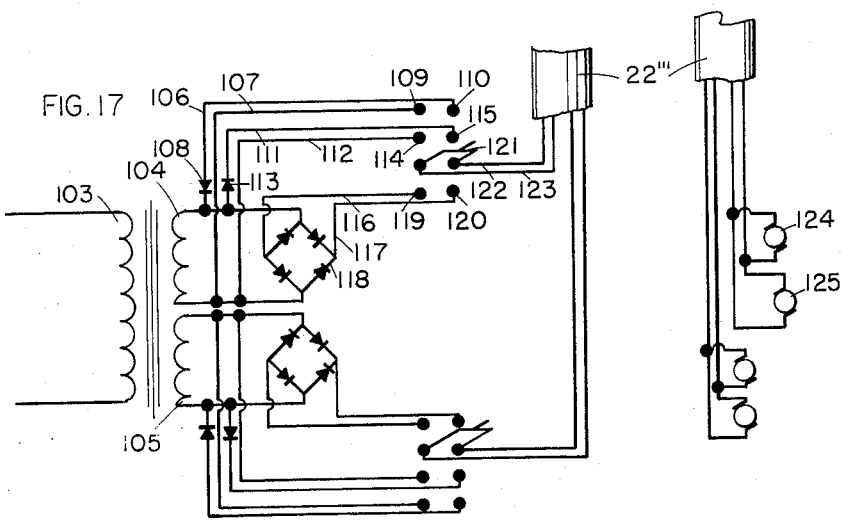
INVENTOR.
ROBERT G. LAHR
BY
ATTORNEY United States Patent Office 3,233,364
Patented Feb. 8, 1966

3,233,364
ELECTRIC DISTRIBUTION MEANS FOR
ELECTRIC DRIVEN VEHICLES
Robert G. Lahr, Box 385, Rte. 1, Hartland, Wis.
Filed Feb. 12, 1962, Ser. No. 172,537
1 Claim. (Cl. 46—243)

This invention relates to means and method for providing motive electric power to vehicles such as toy cars and the like, and more particularly relates to a boom device for enabling electric powered toy vehicles to operate with unrestricted freedom within an area circumscribed by the boom.

It has previously been known to operate electric powered vehicles between conductive overhead and floor structures by contacting the surfaces with sliding terminal connections to obtain electric power for operation of electric motor means within the vehicle. Such an arrangement is satisfactory for larger toys in which an operator rides, but is unsatisfactory for smaller remotely controlled toys because the overhead structure prevents the operator from having an unrestricted view of the vehicles. The means of this invention comprises an adjustable transmission line boom means which reaches to a vehicle to provide for unrestricted movement of a pair of such vehicles within a defined area. A conductive floor surface may be provided as a circuit element in this invention, but in no case is an overhead surface provided which obstructs the view of the vehicles by the operators.

It is an object of this invention to provide an electric distribution system for electric powered toy vehicles which enables the vehicles to be operated within a defined area by operators who have an unobstructed view of the vehicles.

It is another object of this invention to provide boom means for electric transmission lines.

It is another object of this invention to provide electrically powered vehicles with electric energy.

Other objects will become apparent from the drawings and from the following detailed description in which it is intended to illustrate the applicability of the invention without thereby limiting its scope to less than that of all equivalents which will be apparent to one skilled in the art. In the drawings like reference numerals refer to like parts and:

FIGURE 1 is a perspective view of electric distribution means of this invention;

FIGURE 2 is a schematic circuit diagram of one embodiment of a distribution means of this invention;

FIGURE 3 is a schematic circuit diagram of another embodiment of a distribution means of this invention;

FIGURE 4 is a schematic circuit diagram of another embodiment of a distribution means of this invention;

FIGURE 5 is a schematic circuit diagram of another embodiment of a distribution means of this invention;

FIGURE 6 is a schematic circuit diagram of another embodiment of a distribution means of this invention;

FIGURE 7 is a cross-sectional elevation of a portion of antenna means of FIGURE 1;

FIGURE 8 is a cross-sectional elevation of slip ring connection between cable means;

FIGURE 9 is a plan view of one embodiment of boom means of this invention;

FIGURE 10 is a plan view of another embodiment of boom means of this invention;

FIGURE 11 is a cross-sectional elevation of a jointed transmission line connection;

FIGURE 12 is a plan view of another embodiment of boom means of this invention;

FIGURE 13 is a perspective view of another embodiment of a boom means of this invention comprising movable trolley means;

FIGURE 14 is a perspective view of another embodiment of a boom means of this invention comprising a telescoping boom;

FIGURE 15 is a perspective view in detail of a portion of a modification of the embodiment of FIGURE 14;

FIGURE 16 is a perspective view of another embodiment of this invention comprising a stationary overhead distribution connection;

FIGURE 17 is a circuit diagram of a four conductor distribution system of this invention.

Referring now to FIGURE 1, there is shown a boom of this invention comprising a fixed upright standard 11 provided with weighted base 12. The upper extremity of standard 11 is provided with pivotal means 13 to which arm 14 is operably affixed. Arm 14 is configured with extension 15 to which counter weight 16 is affixed. Extension 15 depends downward somewhat from horizontal so that the counter balancing moment on arm 14 is increased by raising extension 15 and depressing arm 14. Arm 14 is jointed with section 14' connected to arm 14 at joint 17 being downwardly disposed from horizontal. When arm 14 and section 14' are lowered the combined force moment thereof around pivot point 13 is decreased and a stable equilibrium obtains at all times between the counter weight 16, on extension 15, and arm 14 and section 14'. Arm 14 and section 14' provide support for either three or four electrical conductors which are connected to mast 20 of vehicle or car 21 as shown. Mast 20 is preferably a flexible whip-type aerial comprising a plurality of coaxial conductors. Alternatively, any other operable construction may be provided. One or two of the conductors comprising flexible conductor line 26 extend from mast 20 on vehicle or car 21 to mast 24 on vehicle or car 25 as shown. Flexible cable 22 enclosing the conductors is shown extending between the end of section 14' of the boom and mast 20. The conductors extend down standard 11 from base 12 to control means 28. Such control means may operably comprise transformers, batteries and other conventional power supply components.

In FIGURE 2 is shown a circuit diagram of one embodiment of a means of this invention. Transformer 28' comprises a single primary winding 30 and double secondary windings 31 and 31' as shown. Transformer 28' is a voltage step-down transformer for providing 6 volt, 12 volt, or 24 volt current from 115 volt line voltage. Full wave rectifiers 32 and 32' are provided, respectively, on each of secondary windings 31 and 31' thereby to provide direct current to each of motors 33 and 33', respectively, of cars 21 and 25. Variable resistances or rheostats 34 and 34' are provided in the output conductors 35 and 35' of rectifiers 32 and 32' to provide voltage control within the circuits and therefore speed control for motors 33, 33'. Double-throw double-pole switches 36, 36' are provided in the circuits, respectively, of rectifiers 32, 32' and comprise cross-connected terminals which provide for the operable reversal of current to motors 33, 33'. Cable 22 comprises four conductors connected to the terminals of reversing switches 36, 36', and to coaxial motor connectors 50', 51', 58 and 59 of motors 33, 33', respectively, of cars 21 and 25 (FIGURE 1).

In FIGURE 3 is shown another embodiment of the invention, similar to that shown in FIGURE 2, but comprising two wire transmission cable 22'. Ground return is provided through conductive plate 27 (FIGURE 1). Double-pole double-throw switches 36, 36' are connected to batteries 40, 40'. The operation of the circuit in FIGURE 3 is substantially identical to that shown in FIGURE 2 except that voltage control variable resistors 34, 34' (FIGURE 2) have been omitted from the control circuit. As will be apparent, a transformer such as transformer 30 of FIGURE 2 may be provided in the circuit of FIGURE 3, or conversely, batteries 40 and 40' of FIGURE 3 may be provided in the circuit of FIGURE 2 in place of the transformer and rectifiers thereof. In FIGURE 3 the cross currents between the circuits of the two motors will be of negligible magnitude when the batteries are of equal strength either when switches 36 and 36' are both closed in whatever combination of positions, or when one or the other of the switches is open. Thus, in practice, the two motors are operable independent one of the other.

In FIGURE 4 is shown another modification of the circuit of FIGURE 2 wherein a transformer comprising windings 30, 31 and 31', and rectifiers 32 and 32' are shown operably connected to double-pole double-throw switches 36 and 36'. Variable resistances 34 and 34' (FIGURE 2) are not shown, but may be provided, if desired. Cable 22''' carries three conductors and the fourth conductor on switches 36 and 36' is grounded. Game board 27' on which vehicles 90 and 91 operate is conductive as are ground wheels 92 of vehicle 91.

The ground wheels of vehicle 90 are non-conductive. Two of the three conductors of cable 22''' are connected to coaxial conductors in mast 93 of vehicle 90 and the third conductor in cable 22''' is tied to mast 93 by insulated rotatable ring and extends therefrom to mast of vehicle 91. The circuit is closed through ground return comprising wheels 92 of vehicle 91, game board 27' and the grounded conductor of switch 36'. Thus, two independent circuits are provided for energizing motors self-contained in each of vehicles 90 and 91.

In embodiments of the invention in which motor speed control apparatus is omitted it is practical to provide common ground return for any number of vehicles operating at the same voltage. This may be accomplished by use of plurally split secondary winding on a transformer with each segment of the secondary being provided with a separate rectifier, or by utilizing individual batteries for each vehicle. It will be apparent that a plurality of motors can be provided in each vehicle and each such motor be connected to a separate conductor with return being made through a common conductor such as a metal game board.

In FIGURE 5 is shown a modification of the circuit of FIGURE 3 wherein cable 22'' comprises three conductors 41, 42 and 43. Conductor 41 is common to both of motors 33 and 33', and conductors 42 and 43 comprise separate returns from each of the motors. The circuits of FIGURE 4 may be connected in common to battery 44, as shown, or may be connected to separate batteries or to rectified alternating current by operable means such as those shown in FIGURES 2 or 3. Double throw switches 36, 36' in FIGURE 4 provide means for controlling motor operation in the same manner as in the circuits of FIGURES 2, 3 and 4.

Battery means such as battery 44 in preferred embodiments of this invention is either a 6 volt or a 12 volt source. Motors 33 and 33' are preferably shunt wound motors, but may be series wound motors or compound wound motors as desired. For use in toy vehicles a very small fractional horsepower motor is sufficient and a rheostat is not necessary in the motor circuit for starting although rheostats similar to rheostats 34 and 34' may be provided in the circuit to provide motor speed control as desired.

In FIGURE 6 is shown a modification of a portion of the circuit of FIGURE 5 wherein cable 22'' comprises leads 41, 42 and 43. Lead 41 is common to motors 33, 33' through means of conductive surface of floor 27. Spring contacts 27 and 27' operably close the circuit through floor 27. Auxiliary lights 45, 45' are provided, respectively, in parallel with motors 33, 33'. Switches 46, 46' are contained in the vehicle and are actuated by independent means such as by a timing or impact device or other means thereby causing the circuits of lights 45, 45' to be opened and closed independent of actuation of motors 33, 33'. Game rules may provide, for example, that while one of lights 45 or 45' is illuminated that vehicle may be operated while the other vehicle may not be operated. Other means than lights, such as bells, etc. may be provided as desired. Leads 42 and 43 comprise the return conductors for motors 33 and 33'. It will be understood that when motors 33 and 33' are connected in parallel as in FIGURE 4 that voltage substantially equivalent to that produced by battery 44 (FIGURE 4) will be provided to each motor.

In FIGURE 7 is shown one embodiment of portions of masts 20 and 24 (FIGURE 1) wherein the connection between the upper extremity of the mast and cable 22 is shown. Cable 22 comprises a four conductor cable as shown in FIGURE 2.

Conductors 50, 51, 52 and 53 in cable 22 are connected, respectively, to coaxial conductors 50', 51' of motor 33 and to rotatable sleeves 52', 53' in the circuit of motor 33' (FIGURE 2). Mast 20 comprises insulated conductor 50' with tubular conductor 51' disposed therearound. At the upper extremity of mast 20 insulated tubular conductor 52' and conductor 53' are disposed around conductor 51'. An insulating retaining ring 54 is provided immediately below slip ring connection 55 on conductor 53'. Slip ring connection 56 is provided on conductor 52'. Each of slip ring connections 55 and 56 is rotatable around mast 20 to prevent fouling of conductors 55' and 56' which are connected, respectively, to slip ring connections 55 and 56. Conductors 55' and 56' leading from mast 20 to mast 24 are connected to the latter member by rotatable cap 57 on conductor 59 of mast 24 and by rotatable connection 60 on sleeve conductor 58 of mast 24, thereby providing a non-fouling connection between masts 20 and 24. As will be apparent a single connector may be strung between masts 20 and 24 as shown in the embodiment of FIGURE 5. It is preferred that slip rings be provided in all the embodiments of this invention to prevent tangling of the electric conductors; however, if desired, fixed connections may be provided, and the conductors may be periodically untangled when necessary.

It is desirable to provide a slip ring connection on cable 22 to prevent crossing of leads 51, 52 and 53 of FIGURE 6 at the end of boom arm section 14' (FIGURE 1). Such means may be provided as shown in FIGURE 7 wherein leads 51, 52 and 53 are shown in contact respectively with slip rings 51', 52' and 53' of boom arm section 14'. The provision of a slip ring connection both on mast 20 and on boom 14' prevents fouling of the conductors. Any other operable connection may be provided as desired, such connections being well known in the art.

Alternatively, it may be desirable to provide a slip ring connection on cable 22 to prevent crossing of leads 50, 51, 52, and 53 of FIGURE 7 at the end of boom arm section 14' (FIGURE 1) rather than on mast 20. Such means may be provided as shown in FIGURE 8 wherein leads 50, 51, 52 and 53 are in contact respectively with slip rings 60, 61, 62 and 63 of boom arm section 14'. The provision of a slip ring connection between mast 20 and boom 14' prevents fouling of the conductors. Any other operable connection may be provided as desired, such connections being well known in the art.

In FIGURE 9 is shown another embodiment of a boom of this invention wherein standard 11' is shown with arm 66 pivotally connected thereto and disposed in a horizontal plane. Arm extension 67 is operably pivoted on arm 66 by means of joint 68. Arm 66 and arm extension 67 carry a cable similar to cable 22 of FIGURE 2 which provides electric energy to cars A and B as shown. Electric leads 26' lead from car A to car B, and boom arm 66 and arm extension 67 are operably rotated about standard 11' by movement of car A.

In FIGURE 10 is shown in greater detail the connection between boom arm extension 67 and aerial 20' on car A. As shown, aerial 20' is pivotally connected to boom arm extension 67 by a bearing and shaft connection which operably enables car A to bias boom arm extension 67 as the car is moved about the playing surface. The boom is preferably constructed of light weight material such as aluminum alloy tubing and therefore be easily biasable by car A. Cable 22 is operably connected to the upper end of aerial 20' which is operably insulated from boom arm extension 67. The pivotal connections between aerial 20' and boom arm extension 67, and between boom arm extension 67 and boom arm 66, and between the boom arm 66 and standard 11' enable vehicle A to move with minimum restriction.

In FIGURE 11 is shown another embodiment of the boom means of this invention comprising fixed standard 11' and stationary arm 86 which is fixedly connected to standard 11'. Pivot 88 is provided at the end extremity of stationary arm 86 and provides connecting means between stationary arm 86 and jointed arm portion 87. A second pivotal connection 68 is disposed between jointed arm portions 87 and 89. Flexible cable 22' is provided at the end extremity of the jointed boom and extends to the aerials of cars A and B as shown. Boom arm portions 86, 87 and 89 preferably constructed of wire elements such as piano wire or the like of sufficient rigidity to be self supporting and also to complete the circuit of cable 22'.

In FIGURE 12 a detail of a portion of the construction of the boom of FIGURE 11 comprising pivot 88 between jointed arm portions 87 and 89 as shown. Arm portion 87 comprises four conductors 70, 71, 72, and 73. A preferred conductor is a relatively stiff wire which can be provided with looped ends through which bolt 74 can be passed. An insulating bushing is provided around bolt 74 to insulate it from the conductors. Tubular spacers 75, 76, and 77 are provided between adjacent electric conductors 70', 71', 72' and 73' of the boom. The spacers may preferably be of nylon composition but may be of other operable material as desired.

In FIGURE 13 is shown another embodiment of a boom of this invention wherein standard 11'' has affixed to the top thereof a boom arm 80 which carries a transmission line by means of trucks mounted on a trackway. Trucks 81, which may be slidable nylon blocks or the like, are provided on the trackway and support flexible transmission cable 22'' suspended below. Cars A and B when being operated pull the transmission line back and forth along boom arm 80 in operable manner while arm 80 is simultaneously rotated about standard 11''. Cable 22'' may be constructed of non-resilient flexible material or may comprise resilient flexible wire material as may be desired.

In FIGURE 14 is shown another embodiment of the invention comprising standard 11''' and telescoping boom arm 91 connected thereto by means of pivotal connection 90. Arm 91 comprises as shown three telescoping sections coaxially disposed and comprising two or more coaxial conductors which are connected to cars A and B in operable manner. As cars A and B operate on a playing surface extensible boom arm 80 is operably rotated about standard 11''' and is extended or retracted by movement of cars A and B in operable manner.

In FIGURE 15 is shown in greater detail the connection between the end of the extensible boom arm 91 and the electrical leads connected to cars A and B. Boom arm 91 is provided with a depending pin 92 and a ring conductor 93 in operable electrical contact with leads 96 and 94, respectively. Conductor 94 is affixed to ring 93 and comprises swivel 95, as shown. Conductor 96 is operably connected to pin 92 and also comprises a swivel 95, as shown. The two leads 96 and 94 cannot be tangled when the connection shown is provided; however, any other operable connection may be provided as desired.

In FIGURE 16 is shown another embodiment of the invention wherein a fixed overhead electrical fixture 100 is provided either at the end of a boom or in an overhead surface such as a ceiling or the like. Extensible coiled leads 101 and 102 are operably connected to fixture 100 by means similar to that shown in FIGURE 15. Leads 101 and 102 extend to the aerials of cars A and B and are connected thereto. The cars may operate over a surface which is limited only by the length to which the cords may be drawn. The embodiment of FIGURE 16 differs from other embodiments of this invention by providing a fixed overhead connection rather than a biasable boom for carrying electrical conductors.

In FIGURE 17 is shown another circuit diagram for use in this invention. Transformer 103 is shown with split secondary windings 104 and 105. Secondary winding 104 is trapped by three pairs of conductors, comprising separate circuits, each circuit comprising a rectifier. The circuit comprising conductors 106 and 107 also comprises half-wave rectifier 108 and terminals 109 and 110. A second circuit comprises connectors 111 and 112, half-wave rectifier 113 and terminals 114 and 115. Half-wave rectifiers 113 and 108 are disposed to pass currents of opposite polarity. A third circuit comprises conductors 116 and 117, full-wave rectifier 118, and terminals 119 and 120. A double-pole triple-throw switch 121 is provided for selective connection to any of the three sets of terminals. Conductors 122 and 123 are connected to the terminals of switch 121 and are carried by cable 122''' into parallel connection to motors 124 and 125 of vehicles as hereinbefore described. A similar plurality of circuits comprising oppositely disposed half-wave rectifiers in two of the circuits and a full-wave rectifier in the third circuit is provided in parallel on transformer secondary 105. The double-pole triple-throw switch is similarly provided. It is apparent that the transformer may be plurally split to provide virtually any number of secondary circuits and each secondary circuit may be provided with a plurality of vehicle circuits as shown for secondary circuit 104. It is thus possible to provide virtually any number of vehicles as desired. It will also be understood that a common ground return may be provided if desired, as will be apparent.

While certain modifications and embodiments of the invention have been described, it is of course to be understood that there are a great number of variations which will suggest themselves to anyone familiar with the subject matter thereof and it is to be distinctly understood that this invention should not be limited except by such limitations as are clearly imposed in the appended claim.

I claim:

An electrically driven remotely controlled toy vehicle device having a supporting plate providing an operating surface, two vehicles disposed on said surface, electric drive means within each vehicle, support means adjacent said supporting surface, boom means pivotally connected to said support means and extending to an end over said surface, a source of electric power adjacent said support means, first electrical conductor means extending from said source of power along said boom means to said end, slip-ring means carried by said end and electrically connected to said first electrical conductor means, second electrical conductor means rotatably connected to said slip-ring means at one end and connected to one of said vehicles at the other end, third electrical conductor means rotatably connected to said slip-ring means at one end and connected to the second of said vehicles at the other end, control means connected to said source of electric power and said first electrical conductor means, for selectively actuating each of said vehicles.

References Cited by the Examiner

UNITED STATES PATENTS

| | | | |
|---|---|---|---|
| 805,268 | 11/1905 | Donnelly | 191—1 X |
| 1,854,885 | 4/1932 | Chevrier | 191—12 |
| 1,856,991 | 5/1932 | Franklin | 46—244 X |

FOREIGN PATENTS 944,323 11/1948 France.

RICHARD C. PINKHAM, *Primary Examiner.*

DELBERT B. LOWE, *Examiner.*